United States Patent [19]
Baumann et al.

[11] Patent Number: 5,497,677
[45] Date of Patent: Mar. 12, 1996

[54] ACCELERATOR PEDAL DEVICE FOR A MOTOR VEHICLE

[75] Inventors: Hans U. Baumann, Stuttgart; Carsten-Joerg Mertens, Aidlingen, both of Germany

[73] Assignee: Dr. Ing. h.c.F. Porsche AG, Weissach, Germany

[21] Appl. No.: 360,367

[22] Filed: Dec. 21, 1994

[30] Foreign Application Priority Data

Dec. 21, 1993 [DE] Germany .......................... 43 43 681.1

[51] Int. Cl.⁶ ...................................................... G05G 1/14
[52] U.S. Cl. .................. 74/513; 74/512; 74/560; 74/506; 74/507; 200/86.5
[58] Field of Search ............................. 74/505, 506, 507, 74/512, 513, 560, 564, 567, 569; 200/86.5; 180/335

[56] References Cited

U.S. PATENT DOCUMENTS

| | | | |
|---|---|---|---|
| 2,670,822 | 3/1954 | Reilly | 74/513 |
| 2,831,367 | 4/1958 | Reilly | 74/513 |

FOREIGN PATENT DOCUMENTS

| | | |
|---|---|---|
| 0343117B1 | 11/1989 | European Pat. Off. . |
| 0343117A1 | 11/1989 | European Pat. Off. . |
| 952829 | 11/1949 | France . |
| 0155096 | 8/1932 | Switzerland ............... 200/86.5 |
| 2102103A | 1/1983 | United Kingdom . |

Primary Examiner—Charles A. Marmor
Assistant Examiner—Chong H. Kim
Attorney, Agent, or Firm—Evenson McKeown Edwards & Lenahan

[57] ABSTRACT

An accelerator pedal device for a motor vehicle is provided with a pedal plate which is swivellably disposed on a pedal holding device in the form of a housing, and an adjusting device is connected with the pedal plate. The pedal holding device consists of an oblong housing comprising two half shells in which components of the adjusting device are held on bearing points molded on to the interior side. On the exterior side of the half shells, transversely extending catch hook strips are arranged, and, on a lower surface of the half shells facing the vehicle body, molded-on common centering domes are provided for the fastening and fixing of the position.

18 Claims, 3 Drawing Sheets

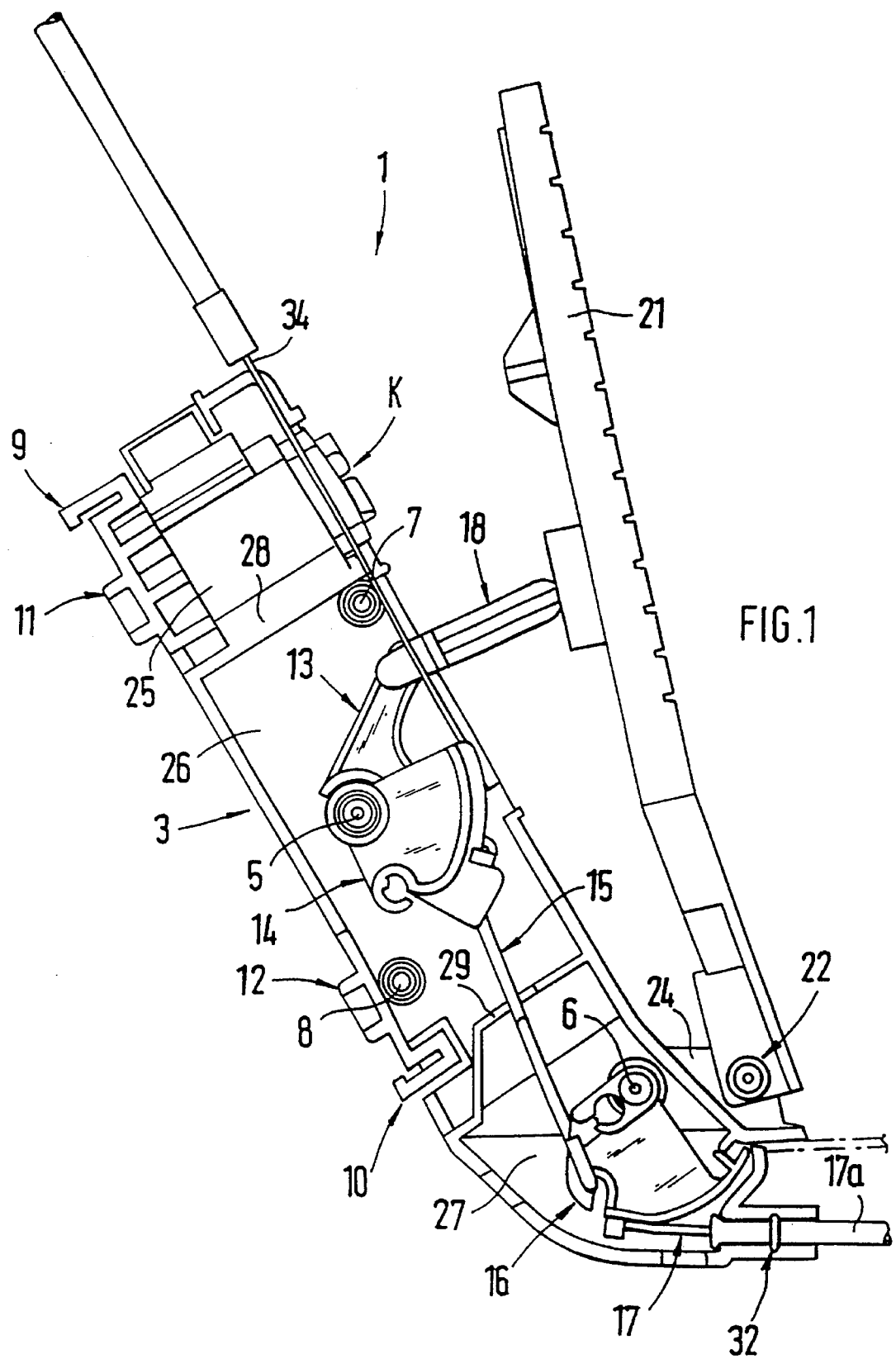

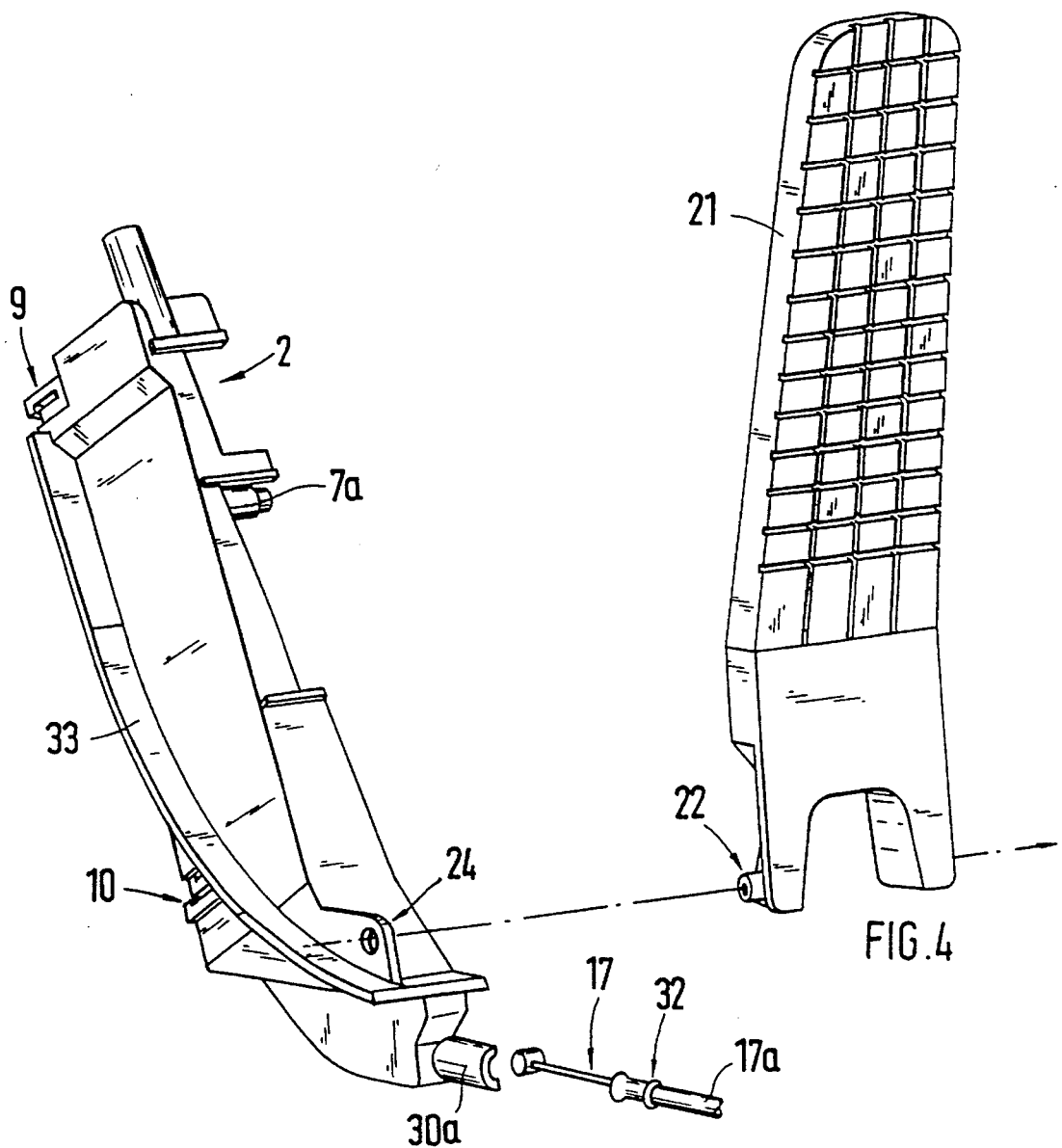

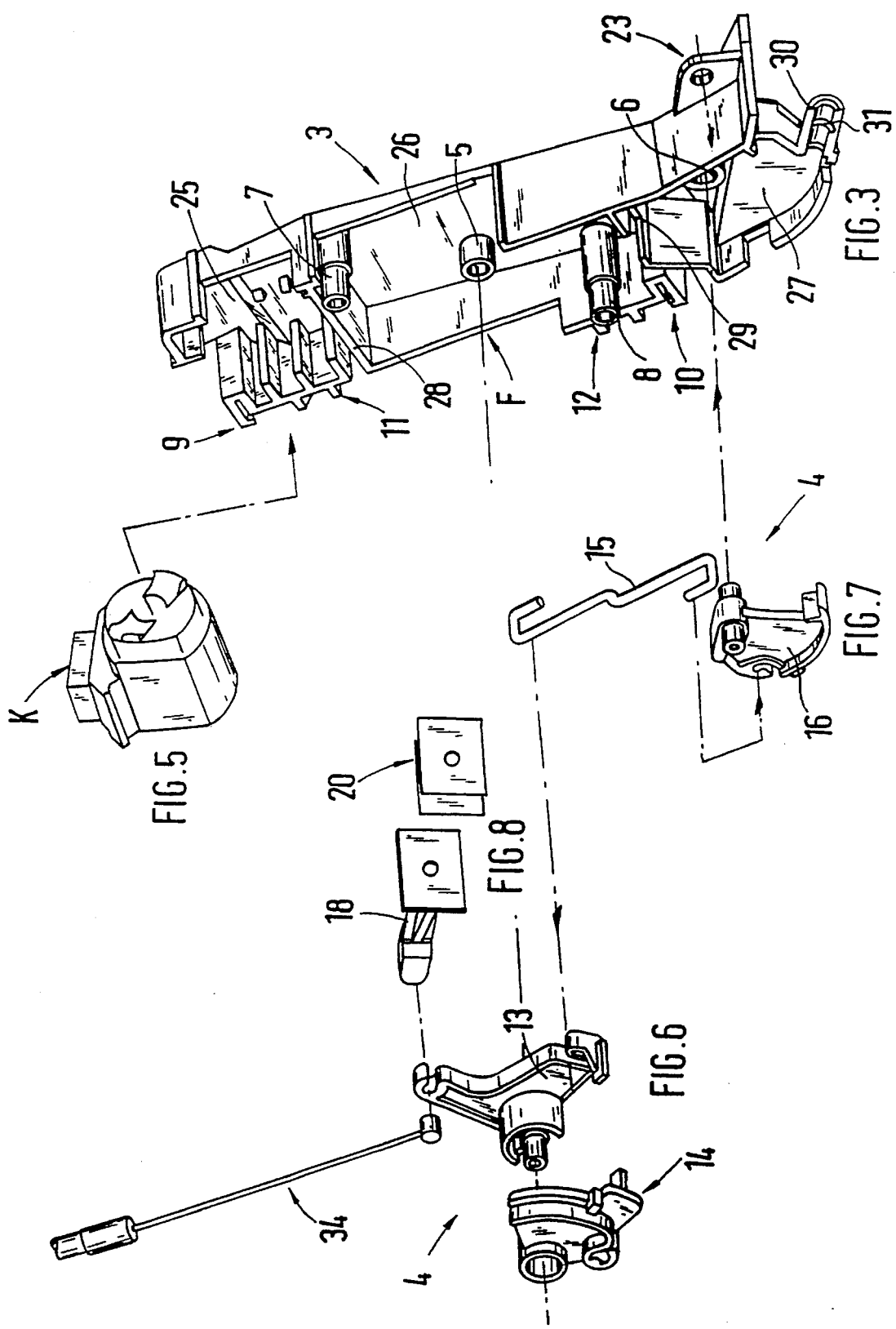

ACCELERATOR PEDAL DEVICE FOR A MOTOR VEHICLE

BACKGROUND AND SUMMARY OF THE INVENTION

This invention relates to an accelerator pedal device for a motor vehicle.

From European Patent Document EP-343 117 B1, an accelerator pedal device for vehicles is known which, for the purpose of fastening, is constructed on the body of the vehicle. The hollow body comprises a shell-shaped housing in which the device is fastened by itself and on which the pedal is swivellably disposed. The housing is closed off on the back side by means of a lid plate. The installation into the vehicle body takes place through a body opening from the direction of the back side and a fastening takes place by means of separate screwing devices.

It is an object of the invention to provide an accelerator pedal device for a motor vehicle which can be preassembled outside the vehicle and which ensures a simple mounting irrespective of the component tolerances of the vehicle body.

According to the invention, this object is achieved by providing an accelerator pedal device for a motor vehicle comprising:

a pedal plate which is swivellably disposed on a pedal holding device, and wherein the pedal holding device includes an oblong housing comprising two half shells fitted together, components of the adjusting device being held on bearing points molded on the interior side of the respective two half shells, wherein transversely extending catch hook strips are provided on the exterior side of the half shells for engaging with catch hook strips fixed to a vehicle body to hold the housing in an in use position at a vehicle, and wherein molded-on common centering domes are provided on a lower surface of the half shells facing the vehicle body for the fastening and fixing of the position.

Principal advantages achieved by means of the invention are that, as a result of the construction of the pedal holding device, the same can be preassembled outside the vehicle and a complete operational test can also be carried out outside the vehicle. A mounting in the vehicle takes place in a simple manner by means of the clipping of catch hook strips into corresponding body-side receiving devices and by means of centering domes which ensure a position fixing and, in addition, can take over lateral forces.

All components of the adjusting device are situated in the housing formed by the half shells of the accelerator pedal device. This permits narrow tolerances of the components with respect to one another. It will no longer be necessary to adjust linkages, stops, a kick-down switch, a gas supply control cable pull or the like.

The preassembly of the accelerator pedal device takes place with the components held in one half shell on corresponding bearing points and with the second half shell fixed and positioned in a precise position with respect to the one half shell, for which positioning bolts and sleeves are used which correspond with one another.

Corresponding to the requirements, additional devices, such as a driving mechanism as well as a cable pull for a cruise control adjusting device may also be integrated into the housing.

So that the receiving of the individual components of the acceleration pedal device can be carried out in a simple mounting operation, the corresponding bearing pins are injection-molded to the half shells made of plastic.

The accelerator pedal is swivellably disposed in injection-molded-on lugs of the half shells by way of injection-molded-on pins on the accelerator pedal base, a fixing in the half shells taking place when these are fitted together.

In preferred embodiments, the accelerator pedal device housing is provided with three chambers which can each be separated by way of a transverse wall, and components of the accelerator pedal device are disposed in each chamber which are partially in an operating connection with one another, for example, by way of a cable pull or by way of a tension rod.

So that the housing formed of the two half shells can be arranged flush with the vehicle floor or a wall or a carpet, a surrounding web is provided on both half shells which preferably covers the carpet or the edge.

The accelerator pedal device is suitable for rear-engine cars, in which the gas supply control cable or rod exits toward the rear as well as for front engine vehicles with a gas supply control cable or rod exiting toward the top front. Likewise, the accelerator pedal device may be used for a floor-mounted accelerator pedal as well as for a suspended accelerator pedal.

Other objects, advantages and novel features of the present invention will become apparent from the following detailed description of the invention when considered in conjunction with the accompanying drawings.

BRIEF DESCRIPTION OF THE DRAWINGS

FIG. 1 is a lateral view of an accelerator pedal device, constructed according to a preferred embodiment of the invention and showing the components of the device disposed in a half shell of the housing;

FIG. 2 is a diagrammatic representation of the other half shell of the housing of the accelerator pedal device of FIG. 1;

FIG. 3 is a perspective diagrammatic representation of the half shell according to FIG. 1;

FIG. 4 is a diagrammatic representation of the accelerator pedal of the device of FIGS. 1–3;

FIG. 5 is a diagrammatic representation of a kick-down switch of the device of FIGS. 1–3;

FIG. 6 is a representation of a driving disk with a reversing lever of the device of FIGS. 1–3;

FIG. 7 is a view of a deflection disk of the device of the device of FIGS. 1–3; and FIG. 8 is a view of a pressure rod with a spring element of the device of FIG. 1–3.

DETAILED DESCRIPTION OF THE DRAWINGS

The accelerator pedal device 1 comprises essentially a pedal holding device assembled from two half shells 2, 3 to form a closed oblong housing. For receiving an adjusting device 4 (FIG. 7), the half shells 2, 3 have injection-molded bearings 5, 6 and, for being fitted on one another, are provided with positioning pins 7, 8 on half shell 3 which can be fitted into corresponding sleeves 7a, 8a. A connection of the two half shells takes place by way of screwing devices (threaded bolts or screws). For the fixing of the housing on a body wall or for a connecting with a vehicle floor, clips elements are used, such as strips 9, 10 having catch hooks. For the position fixing and force absorption of the housing 2, 3, centering domes 11 and 12 are molded to the bottom of the half shell 2, 3.

For the mounting of the adjusting device 4, this adjusting device 4 is completely preassembled, for example, in the half shell 3; i.e., the driving disk 14 assembled with a reversing lever 13 and the hung tension rod 15 is held on the bearing point 5. A pressure rod 18 is connected with the reversing lever 13, which pressure rod 18 is in a direct operating connection with the pedal plate 21 by means of a prestressed spring element 20. The deflecting disk 16 with the hung tension rod 15 and the connected gas supply control cable 17 is arranged on the bearing point 6.

The pedal plate 21 is swivellably disposed by means of two molded-on lateral bolts 22 in bearing lugs 23, 24 of the half shells 2, 3. The whole adjusting device 4 is fixed in the hollow space of the housing by placing the second half shell 2 on the first half shell 3 and by means of a screwing or bolting together of the half shells 2 and 3.

The components of the device 4 are arranged in different chambers 25, 26 and 27 which are each separated from one another by way of transverse walls 28, 29. These transverse walls are used mainly for reinforcing the housing. So that the accelerator pedal device 1 can be used universally for different vehicles, receiving devices are provided for additional devices, such as a kick-down switch K and for a driving disk 14 of a cruise control device.

Thus, the kick-down switch K is arranged in the end-side upper chamber 25 and the driving disk 14, together with the reversing lever 13 is arranged in the central chamber 26. The deflecting disk 16 is held on the bearing 6 in the end-side lower chamber 27.

For leading the gas supply control cable 17 through into the chamber 27 and for fixing the cable pull sleeve 17a, a half sleeve 30, 30a is injection-molded to each half shell 2, 3 in which half sleeves 30, 3A, by way of a groove 31, a bead 32 of the sleeve 17a is fixed after the two half shells are fitted together.

The half shells 2 and 3 have a web 33 which surrounds the housing on the outside in the longitudinal direction and which follows a bottom contour and covers the carpet when installed at a carpeted vehicle body section.

The kick-down switch K for automatic transmission vehicles inserted in the chamber 25 is actuated directly by the fully pushed down accelerator pedal plate 21. At the same time, the kick-down switch K forms a pedal path limit stop. In the case of vehicles without any kick-down switch, this switch is replaced by a simple dummy as a limit stop.

For vehicles with a cruise control device, the additional driving disk 14 is required. This driving disk is actuated by a cable pull 34 of a motor operator, which motor operator is not shown. The driving disk 14 reaches under the reversing lever 13 and takes it along if the driving disk is actuated itself. When the acceleration is normal, the driving disk 14 remains in its position.

The assembly in a vehicle of the housing of the accelerator pedal device, with the integrated device 4 consisting of the two half shells 2 and 3, takes place by way of the injection-molded catch hook strips 9 and 10 which reach over a correspondingly constructed strip, fold or the like of the vehicle floor. By means of the centering domes 11, 12, which are inserted into bores or receiving devices in the vehicle floor, the housing is fixed in its position.

The mutual connection of the components, such as the connection of the tension rod 15 with the reversing lever 13, takes place by way of a clips connection. This type of a connection exists also between the pressure rod 18 and the reversing lever 13, in which case this reversing lever 13 has a receiving device into which, for example, a transverse pin of the rod 18 is clamped. High-expenditure screwed connections are therefore not required.

Although the invention has been described and illustrated in detail, it is to be clearly understood that the same is by way of illustration and example, and is not to be taken by way of limitation. The spirit and scope of the present invention are to be limited only by the terms of the appended claims. WHAT IS CLAIMED

What is claimed is:

1. Accelerator pedal device for a motor vehicle comprising:

a pedal plate which is swivellably disposed on a pedal holding device, and an adjusting device connected with the pedal plate, wherein the pedal holding device includes an oblong housing comprising two half shells fitted together, components of the adjusting device being held on bearing points molded on the interior side of the respective two half shells, wherein transversely extending catch hook strips are provided on the exterior side of the half shells for engaging with catch hook strips fixed to a vehicle body to hold the housing in an in use position at a vehicle, and wherein molded-on common centering domes are provided on a lower surface of the half shells facing the vehicle body for the fastening and fixing of the position.

2. Device according to claim 1, wherein the components of the adjusting device are arranged to be preassembled on the bearing points of one of the half shells and are fixed by means of the other of the fitted-on half shells, the half shells being fixed in their position by way of positioning pins and by means of sleeves corresponding with these positioning pins.

3. Device according to claim 1, wherein the accelerator pedal is swivellably held by way of laterally molded-on pins in bearing lugs provided outside the housing on each half shell.

4. Device according to claim 2, wherein the accelerator pedal is swivellably held by way of laterally molded-on pins in bearing lugs provided outside the housing on each half shell.

5. Device according to claim 1, wherein the fitted-together half shells form a central chamber and two end side chambers, and wherein a transmission element of the adjusting device is provided which interacts directly by way of a pressure rod with the accelerator pedal and includes a reversing lever and an optionally used driving disk held on a bearing point between the end-side chambers in the central chamber.

6. Device according to claim 5, wherein a kick-down switch is arranged in one end-side upper chamber between receiving devices, and wherein a deflecting disk for a hung gas supply control cable is arranged on another bearing point in the other end-side lower chamber.

7. Device according to claim 5, wherein the chambers are partially separated from one another by way of transverse walls reinforcing the housing, and wherein openings for a cable pull of a cruise control device and for a tension rod connecting further components of the adjusting device are provided in the transverse walls.

8. Device according to claim 1, wherein the two half shells have two molded-on half sleeves between which a cover of a gas supply control cable can be fixed by way of a beaded ring in a ring groove.

9. Device according to claim 1, wherein the half shells have a web which surrounds the housing on the outside in the longitudinal direction, which web follows a contour of a floor area of a vehicle body and forms a flush end with respect to a floor carpet when assembled on the vehicle body with a floor carpet.

10. Device according to claim 1, wherein the fitted-together half shells form a central chamber, an upper chamber, and a lower chamber.

11. Device according to claim 10, wherein a kick-down switch is arranged in said upper chamber between receiving devices formed by the half shells, said kick-down switch being disposed to be engaged by the pedal plate during maximum acceleration positioning of the pedal plate.

12. Device according to claim 10, wherein a reversing lever is disposed in the central chamber and pivotally supported at a bearing point formed by molded on bearing parts of the two half shells, said reversing lever having a lever arm connected to a pressure rod connected to the pedal plate and another lever arm operably connected to move a gas supply control member.

13. Device according to claim 12, wherein said gas supply control member extends outside of the housing from the lower chamber.

14. Device according to claim 13, wherein said gas supply control member is operably connected to the reversing lever by a cable pull extending between the central chamber and the lower chamber and connected to a pivotally mounted deflecting plate in the lower chamber.

15. Device according to claim 14, further comprising a driving disk in the central chamber which is pivotally supported at the bearing point for the reversing lever, said driving disk being operably connectable to a cruise control lever.

16. Device according to claim 15, wherein a kick-down switch is arranged in said upper chamber between receiving devices formed by the half shells, said kick-down switch being disposed to be engaged by the pedal plate during maximum acceleration positioning of the pedal plate.

17. A method of making an accelerator pedal device for a motor vehicle, comprising:

molding a first housing half shell from plastic, molding a second housing half shell from plastic, pre-installing an accelerator pedal adjusting device in said first housing half shell with pivotal members of said adjusting device bearingly supported on molded on bearing parts of said first housing half shell, and connecting said first and second housing half shells to form a housing enclosing said adjusting device.

18. A method according to claim 17, wherein said molding of said first and second housing half shells includes forming a bearing point for pivotably supporting a foot operated pedal plate disposed outside the housing and operably connected to operate the adjusting device in the housing.

* * * * *